United States Patent
Schlenga et al.

(10) Patent No.: US 8,983,562 B2
(45) Date of Patent: Mar. 17, 2015

(54) INDUCTIVE FAULT CURRENT LIMITER WITH DIVIDED SECONDARY COIL CONFIGURATION

(71) Applicant: Bruker HTS GmbH, Hanau (DE)

(72) Inventors: Klaus Schlenga, Linkenheim-Hochstetten (DE); Alexander Usoskin, Hanau (DE)

(73) Assignee: Bruker HTS GmbH, Hanau (DE)

( * ) Notice: Subject to any disclaimer, the term of this patent is extended or adjusted under 35 U.S.C. 154(b) by 0 days.

(21) Appl. No.: 14/040,827

(22) Filed: Sep. 30, 2013

(65) Prior Publication Data

US 2014/0100116 A1    Apr. 10, 2014

(30) Foreign Application Priority Data

Oct. 5, 2012    (DE) .......................... 10 2012 218 260

(51) Int. Cl.
| | | |
|---|---|---|
| H01B 12/00 | (2006.01) | |
| H01F 6/00 | (2006.01) | |
| H01L 39/00 | (2006.01) | |
| H02H 9/02 | (2006.01) | |
| H01F 6/06 | (2006.01) | |

(52) U.S. Cl.
CPC ................ H02H 9/023 (2013.01); H01F 6/06 (2013.01); *H01F 2006/001* (2013.01); *Y02E 40/66* (2013.01); *Y02E 40/69* (2013.01)
USPC ........................................................ 505/211

(58) Field of Classification Search
CPC ............... H01F 6/06; H01F 6/00; H01F 6/02; H01F 41/048; G01R 33/3815
See application file for complete search history.

(56) References Cited

U.S. PATENT DOCUMENTS

| | | | | |
|---|---|---|---|---|
| 5,140,290 | A * | 8/1992 | Dersch .......................... | 505/211 |
| 5,379,020 | A * | 1/1995 | Meier et al. ................... | 505/211 |
| 5,694,279 | A | 12/1997 | Mumford | |
| 6,016,094 | A | 1/2000 | Gerhold | |
| 6,236,645 | B1 * | 5/2001 | Agazzi ........................... | 370/286 |
| 6,795,282 | B2 | 9/2004 | Neumueller | |
| 7,586,717 | B2 | 9/2009 | Usoskin | |
| 2007/0127171 | A1 | 6/2007 | Lee | |
| 2012/0002336 | A1 * | 1/2012 | Usoskin et al. .............. | 361/93.9 |
| 2012/0306606 | A1 | 12/2012 | Noe | |

FOREIGN PATENT DOCUMENTS

| | | |
|---|---|---|
| DE | 19 524 579 | 1/1997 |
| DE | 195 24 579 | 1/1997 |
| EP | 2 402 961 | 1/2012 |
| FR | 2 691 591 | 11/1993 |

\* cited by examiner

*Primary Examiner* — Colleen Dunn
(74) *Attorney, Agent, or Firm* — Paul Vincent (57) ABSTRACT

An inductive fault current limiter (1), has a normally conducting primary coil assembly (2) with a multiplicity of turns (3), and a superconducting, short-circuited secondary coil assembly (4). The primary coil assembly (2) and the secondary coil assembly (4) are disposed at least substantially coaxially with respect to each other and at least partially interleaved in each other. The secondary coil assembly (4) has a first coil section (4a) disposed radially inside the turns (3) of the primary coil assembly (2) and a second coil section (4b) disposed radially outside the turns (3) of the primary coil assembly (2). The fault current limiter has an increased inductance ratio.

17 Claims, 4 Drawing Sheets

INDUCTIVE FAULT CURRENT LIMITER WITH DIVIDED SECONDARY COIL CONFIGURATION

BACKGROUND OF THE INVENTION

The invention relates to an inductive fault current limiter, comprising
a normally conducting primary coil assembly with a multiplicity of turns, and
a superconducting, short-circuited secondary coil assembly,
wherein the primary coil assembly and the secondary coil assembly are disposed at least substantially coaxially with respect to each other and at least partially interleaved in each other.

Such an inductive fault current limiter is known from EP 2 402 961 A1.

Fault current limiters are used to limit the current drawn from a source in case of short circuits. With superconducting fault current limiters, comparatively high currents, for example, in public electrical supply networks, can be made safe.

Superconducting fault current limiters of the direct current type comprise, for example, a superconducting conductor section, through which the current to be limited flows. If the current rises due to a short circuit, the critical current in the superconducting conductor section is exceeded so that it becomes normally conducting ("quench"), which greatly increases the resistance. This causes the current flowing through the conductor section to fall correspondingly. This type of fault current limiter is termed the resistive type.

Superconducting fault current limiters for alternating current applications can be implemented both as resistive and as inductive fault current limiters. Inductive fault current limiters are essentially constituted by inductively coupled turns. The alternating current to be limited flows through a normally conducting primary coil assembly ("primary side") and, in a superconducting secondary coil assembly ("secondary side"), a current is induced that counteracts the magnetic flux produced by the current in the primary coil assembly. This largely cancels out the inductance of the primary coil assembly. If the alternating current to be limited in the primary coil assembly rises due to a short circuit, the induced current in the secondary coil assembly also rises until the critical current is exceeded in the secondary coil assembly and the secondary coil assembly becomes normally conducting ("quench"). In the normally conducting condition of the secondary coil assembly, its current only compensates for a small part of the magnetic flux of the primary coil assembly, which, in turn, raises the inductance of the primary coil assembly. This increase in inductive resistance limits the current through the primary coil assembly.

An inductive fault current limiter is known from EP 2 402 961 A1, in which a secondary coil, which comprises a plurality of turns radially disposed within the primary coil, and which is constituted as a superconducting, short-circuited ring, is disclosed. From DE 10 2010 007 087 A1, an inductive fault current limiter is known, in which a cryostat with a secondary coil is disposed inside a primary coil. From DE 196 28 358 C1 (and from U.S. Pat. No. 5,140,290 A, U.S. Pat. No. 6,795,282 B2, U.S. Pat. No. 7,586,717 B2, U.S. Pat. No. 5,694,279 A, DE 195 24 579 A1, U.S. Pat. No. 5,379,020 A), it is known that a primary coil and a secondary coil may be disposed side by side and coupled via a ring-shaped iron core.

The efficiency of an inductive fault current limiter is measured according to the inductance ratio of the primary coil assembly in a superconducting secondary coil assembly ("normal operation") and in a normally conducting secondary coil assembly ("fault operation"). During fault operation, the current in the primary coil assembly should be very much reduced as compared with normal operation and in correspondence with a high inductance ratio.

The object of the invention is to provide a fault current limiter with an increased inductance ratio.

SUMMARY OF THE INVENTION

This object is achieved by an inductive fault current limiter of the type stated above, which is characterized
in that the secondary coil assembly comprises a first coil section and a second coil section,
wherein the first coil section of the secondary coil assembly is disposed radially inside the turns of the primary coil assembly,
and wherein the second coil section of the secondary coil assembly is disposed radially outside the turns of the primary coil assembly.

According to the invention, the secondary coil section is radially divided into (at least) two coil sections, and the primary coil assembly is disposed radially between these two coil sections of the secondary coil assembly.

To ensure high efficiency of an inductive fault current limiter, the magnetic flux of the primary coil assembly must, in normal operation, be as completely as possible canceled out by the magnetic flux induced in the secondary coil assembly. To achieve this, the secondary coil assembly should be brought as close as possible to the primary coil assembly, which is not easy to achieve because of design constraints, such as the wall thicknesses and distances of a cryostat vessel for the superconducting secondary coil assembly and the finite radial extent of the coil assemblies. In the case of inductive fault current limiters for higher currents (for example, in public electricity supply networks), the primary coil assembly and the secondary coil assembly are of a considerable thickness so that the primary coil assembly is often at a considerable distance from a substantial proportion of the turns of the secondary coil assembly, making complete compensation of the fluxes mentioned above practically impossible.

By dividing the secondary coil assembly into multiple coil sections and inserting the primary coil assembly, this distance can be effectively reduced despite the larger total radial extent. This improves compensation of the magnetic flux of the primary coil assembly by the secondary coil assembly in normal operation and a higher inductance ratio is achieved.

The coil sections of the secondary coil assembly each typically comprise at least one superconductively short-circuited conductor loop. The coil sections of the secondary coil assembly are also typically electrically insulated from each other; the compensation effect adjusts itself for the various coil sections independently of each other. Alternatively, the coil sections of the secondary coil assembly can also be connected in such a way that their B-fields in the inner region of the radially interior coil sections add up, wherein the coil sections are usually connected in series. The turns of the primary coil assembly are typically made of copper. In the secondary coil assembly, in particular, strip-shaped superconductors ("coated conductors") can be used, but superconducting wires with superconducting filaments made of $Nb_3Sn$, $NbTi$, $MgB_2$ can also be used. The coil sections of the secondary coil assembly are typically each protected from burning through in the event of quenching by a normally conducting shunt configuration (typically ring-shaped); with suitable conductor properties (in particular, suitable conductor geometry), however, it is possible to dispense with the shunt configuration (if desired, for example, especially in a single-turn coil made of strip conductors, for which $3 \leq U/B \leq 10$ applies, where U: circumference of the coil and B: conductor width). The coil sections of the secondary coil assembly are typically disposed in a common cryostat or also in separate cryostats for cooling; a cryostat can be cooled according to the invention with e.g. liquid helium or liquid nitrogen.

In an advantageous embodiment of the inventive fault current limiter, the primary coil assembly is disposed substantially centrally between an outer side of the first coil section of the secondary coil assembly and an inner side of the second coil section of the secondary coil assembly. In this way, very good compensation of the magnetic flux of the primary coil assembly can be achieved. The primary coil assembly is substantially centrally disposed if the radial distances between the outer side of the first coil section and the innermost turn layer (or inner side) of the primary coil assembly, on one hand, and between the radially outermost turn layer (or outer side) of the primary coil assembly and the inner side of the second coil section, on the other hand, differ by 20% or less, preferably 10% or less (relative to the smaller distance). If the radial distances in the axial direction vary, the above relation can refer to the average radial distances; alternatively, the respective smallest radial distances can be used. If the turn density and/or the number of turns in the various coil sections of the secondary coil assembly differs considerably, or the turn density in the primary coil assembly differs considerably, the primary coil assembly can alternatively be positioned such that the average radial distance between the turns of the primary coil assembly and the secondary coil assembly is minimized.

In an advantageous embodiment, the coil sections of the secondary coil assembly each comprise one or more superconducting, ring-shaped closed single-turn coils. Single-turn coils are easy to manufacture, in particular, with strip-shaped superconductors; the ring-shaped single-turn coils can also be constituted without joints (by superconducting coating of a ring-shaped closed substrate with superconducting material). Multiple superconducting single-turn coils can be inserted radially into each other or also axially one above the other to constitute a coil section of the secondary coil assembly.

An embodiment is preferred, in which the secondary coil assembly comprises multiple turns, which are distributed substantially evenly among the coil sections of the secondary coil assembly. With such a distribution, the radial distance of the most distant turns of the two coil sections of the secondary coil assembly from the primary coil assembly can usually be kept small. The turns are distributed substantially evenly if the number of turns of the coil sections differ by 20% or less, preferably by 10% or less, relative to the smallest number.

In an alternative embodiment, the secondary coil assembly comprises multiple turns, which are distributed unevenly among the coil sections of the secondary coil assembly. In this way, the current distribution in the turns of the coil sections of the secondary coil assembly can be optimized, in particular, to maximize the current-carrying capacity of the fault current limiter in normal operation. The turns are preferably distributed sufficiently unevenly that the number of turns of the coil sections differs by 25% or more, preferably by 40% or more, relative to the smallest number.

An embodiment is advantageous, in which the secondary coil assembly has multiple turns, which are distributed unevenly in the coil sections of the secondary coil assembly in the radial direction and/or in the axial direction, and/or that the coil sections of the secondary coil assembly extend different distances in the axial direction. In this way, the current distribution in the turns of the coil sections of the secondary coil assembly can also be optimized, in particular, in order to maximize the current-carrying capacity of the fault current limiter in normal operation.

An embodiment is especially preferred, in which the coil sections of the secondary coil assembly are each electrically conductively connected to a normally conducting shunt configuration. With the shunt configurations, burning through (in particular, melting) of the superconductor in the coil sections of the secondary coil assembly in the event of quenching can be prevented; the shunt configuration provides a low-resistance parallel current path with respect to the quenched coil section so that the current from the coil section can be conducted out into the shunt configuration.

In an advantageous variant, the shunt configuration of the first coil section of the secondary coil assembly is disposed radially inside at least a part of the first coil section of the secondary coil assembly, and the shunt configuration of the second coil section of the secondary coil assembly is disposed radially outside at least a part of the second coil section of the secondary coil assembly. Eddy currents can be induced in a shunt configuration in normal operation. This increases the necessary cooling power and noticeable stray inductance of the primary coil assembly can occur, causing the inductance ratio to decrease. By positioning the shunt configuration of the first coil section radially inside the first coil section (or at least a part thereof), this shunt configuration can be shielded from the primary coil assembly located beyond this (in this case, radially further out). Correspondingly, by positioning the shunt configuration of the second coil section radially outside the second coil section (or at least a part thereof), this shunt configuration can be shielded from the primary coil assembly located beyond this (in this case, radially further in). This minimizes eddy currents in the shunt configurations. Note that, typically, both the first coil section and the second coil section of the secondary coil assembly each provide at least one superconductively short-circuited current path.

A variant of this embodiment is preferred, in which the shunt configurations each have one or more closed shunt rings. In this case, the current from the secondary coil assembly can be brought in over the entire circumference by means of the shunt ring or rings in the event of quenching. The shunt ring or rings are usually made of strip-shaped stainless steel.

An embodiment is also preferred, in which the shunt configurations each have a multiplicity of metallic jumpers, which electrically conductively connect each shunt configuration with the associated coil section of the secondary coil assembly. By contacting using individual jumpers, the extent of individually protected regions can be specifically set. Six or more, in the case of larger fault current limiters (for example, for public electricity supply networks), also twelve or more jumpers, are usually provided over the circumference of a coil section of the secondary coil assembly. In single-turn coils made of strip-shaped superconductors, the distance ABS of the jumpers in the circumferential direction is preferably chosen such that the following applies with respect to the ratio to the conductor width B: $3 \leq ABS/B \leq 10$. This prevents the superconductor from burning through in the event of a quench.

An embodiment is especially preferred, in which the primary coil assembly and the secondary coil assembly are at least substantially constructed to be rotationally symmetric with respect to an axis, in particular, with respect to a vertical axis. In this way, magnetic field peaks are avoided, which enables a high current-carrying capacity of the fault current limiter. A vertical orientation simplifies the structure, in particular, due to reduced bearing loads.

In a further, preferred embodiment, a ferromagnetic core is disposed radially inside the first coil section of the secondary coil assembly. With the ferromagnetic core, the magnetic flux is bundled, improving the compensation of the magnetic flux of the primary coil assembly in normal operation and increasing the inductance ratio (and also the impedance ratio) between fault operation and normal operation. The ferromagnetic core can be constituted with different shapes, for example, as a tube or cylinder. The interior space of the first coil section of the secondary coil assembly can be filled entirely or (preferably) only partially by the core. For any shape of ferromagnetic core, the excitation of shielding currents in the core can be suppressed by laminated structures, slots, or similar suitable measures.

In a preferred embodiment of the inventive fault current limiter, the secondary coil configuration extends in the axial direction substantially the same distance as the primary coil configuration. This also improves compensation of the magnetic flux of the primary coil assembly in normal operation. The secondary coil assembly and the primary coil assembly extend substantially the same distance if the axial lengths of the secondary coil configuration and of the primary coil configuration differ by 20% or less, preferably by 10% or less, relative to the shorter length. If the coil sections of a coil assembly extend different distances in the axial direction, the length of the coil assembly is determined from the two ends of the coil sections that project farthest in the axial direction on each side.

An embodiment is also preferred, in which the secondary coil assembly is made of a high-temperature superconducting material, in particular, YBCO or BSCCO. This increases the current-carrying capacity of the fault current limiter. For the purpose of the invention, high-temperature superconductor materials are all superconducting materials with a critical temperature of 40 K or higher.

An embodiment is especially preferred in which the first and second coil section of the secondary coil assembly are disposed in a common cryostat or in different cryostats, and that the primary coil assembly, the first and second coil section of the secondary coil assembly, and the common cryostat or the different cryostats are positioned and dimensioned such that, for the interstices ZR in the radial direction between mutually opposite sides of the primary coil assembly, on the one hand, and the first and second coil sections of the secondary coil assembly, on the other hand: $ZR<\frac{1}{2}D_P+\frac{1}{2}D_{SS}$, preferably $ZR<\frac{1}{2}D_{SS}$, where $D_P$: thickness of the primary coil assembly in the radial direction limiting the relevant interstice ZR and $D_{SS}$: thickness of the coil section of the secondary coil assembly in the radial direction limiting the relevant interstice ZR. This ensures that the distance saving due to the division of the secondary coil assembly is not already substantially canceled out by the interstices stated above (which depend on the wall thickness of the cryostat and other factors). In the case of interstices that are variable (for example, in the axial direction), the relation refers to the averaged interstices; alternatively, it can be applied to the smallest interstices. In particular, the following applies: $ZR\le\frac{1}{2}D_P+\frac{1}{4}D_{SS}$ or also $ZR\le\frac{1}{4}D_P+\frac{1}{4}D_{SS}$. Note that for each primary coil assembly, there are two interstices that meet the conditions of this embodiment. Also note that different interstices ZR may be of different sizes and that the thicknesses $D_{SS}$ of different coil sections of the secondary coil assembly may also be different.

An embodiment is also advantageous, in which the secondary coil assembly has N coil sections, where $N\in\mathbb{N}$ and $N\ge3$, and that the fault current limiter has N−1 primary coil assemblies, wherein each primary coil assembly is disposed radially between two coil sections of the secondary coil assembly, in particular, wherein N=3 or N=4. In this embodiment, the secondary coil assembly is divided even more finely, enabling the primary coil assemblies to be even closer to the turns of the coil sections of the secondary coil assembly; this enables an even better inductance ratio. The primary coil assemblies are electrically connected in such a way that their B-fields in the inner region of the radially inner primary coil assembly add up, wherein the primary coil assemblies are usually connected in series.

An embodiment is preferred, in which a coil section of the secondary coil configuration, which is disposed radially between two primary coil assemblies, has a shunt configuration, which is surrounded both radially inside and radially outside in each case by a part of this coil section. In this case, this shunt configuration is shielded from the two adjacent primary coil assemblies by the two parts of the coil section of the secondary coil assembly, whereby eddy currents are avoided. Each of the two parts of the surrounding coil section typically provides at least one superconductively short-circuited current path.

Further advantages result from the description and the drawing. Moreover, the features stated above and further below can be used singly or together in any combination. The embodiments shown and described are not intended to be an exhaustive list but are rather examples to explain the invention.

BRIEF DESCRIPTION OF THE DRAWING

The invention is shown in the drawing and is explained in more detail using the example of the embodiments. The figures show.

DESCRIPTION OF THE PREFERRED EMBODIMENT

Figure 1:
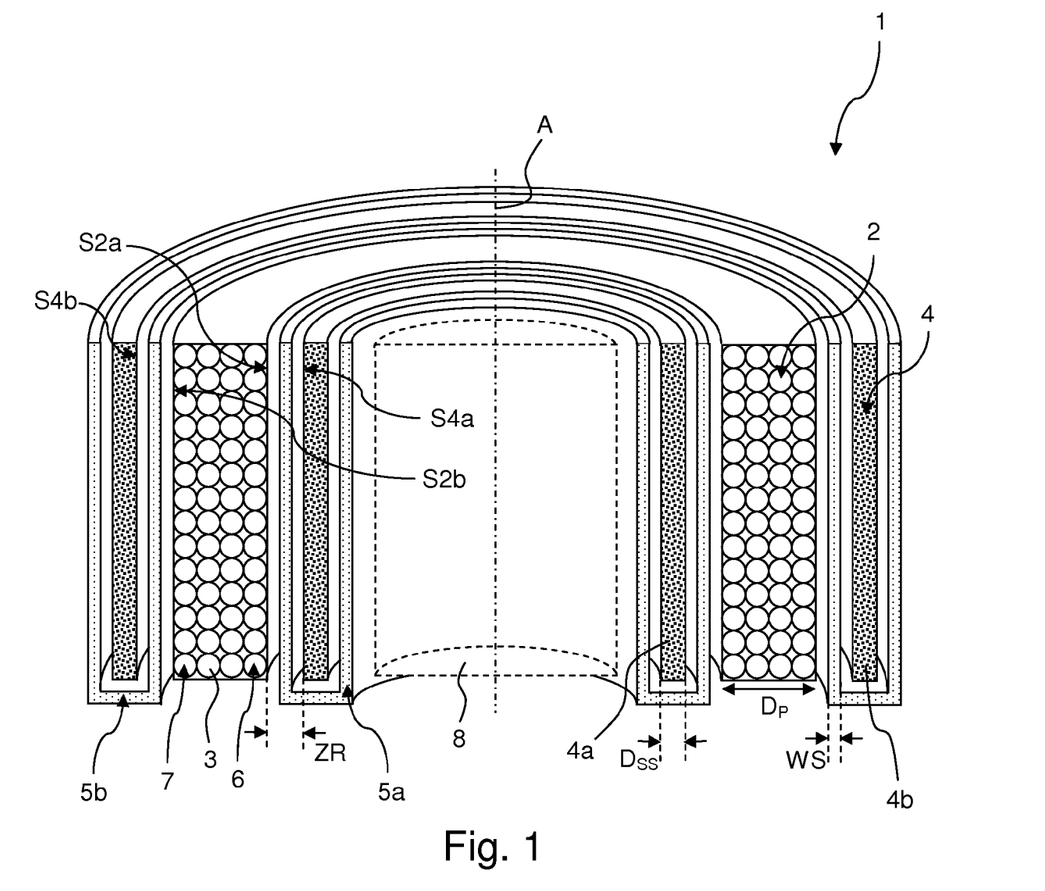
FIG. 1 a schematic, combined sectional and oblique view of a first embodiment of an inventive inductive fault current limiter.

FIG. 1 shows a schematic view of a section through an embodiment of an inventive fault current limiter 1.

The fault current limiter 1 is constructed essentially rotationally symmetrically with respect to a vertical axis A. It comprises a normally conducting primary coil assembly 2 with a multiplicity of turns 3, wherein, in the example shown, the primary coil assembly 2 has four layers of turns 3. Radially inside the primary coil assembly 2, a first coil section 4a of a superconducting secondary coil assembly 4 is disposed, and radially outside the primary oil assembly 2, a second coil section 4b of the superconducting secondary coil assembly 4 is disposed. The primary coil assembly 2 and the secondary coil assembly 4 are coaxially aligned with respect to the axis A and are of equal length in the axial direction; however, it is enough if this orientation or these dimensions are substantially complied with (for example, by mutual tilting of up to 5°, or an axial protrusion of the secondary or primary coil assembly of up to 20% in total).

The two coil sections 4a, 4b of the secondary coil assembly 4 are disposed in a cryostat 5a, 5b, whose interior spaces are cooled in a manner not depicted (for example, with liquid nitrogen at 77 K), so that the secondary coil assembly 4 is at a temperature that is below the critical temperature of the superconducting material used. In the simplest case, the coil sections 4a, 4b comprise only one superconducting short-circuited single-turn coil; alternatively, the coil sections 4a, 4b can be constituted by multiple turns (if applicable, distributed among multiple layers of turns), for example, wound in a solenoid shape. The turns of the secondary coil assembly 4 are then superconductively short-circuited individually and/or in groups (in particular, according to the coil sections), or together.

If desired, an iron core 8 (indicated by dashed lines) can be provided in the interior of the first coil section 4a. The iron core 8 typically fills only part of the interior space of the first coil section 4a; in particular, the iron core 8 can be hollow (for example, tube-like).

In this case, the primary coil assembly 2 is disposed centrally between the outer side S4a of the first coil section 4a and the inner side S4b of the second coil section 4b of the secondary coil assembly 4.

An interstice ZR measured in the radial direction between the mutually facing, opposite sides S4a (outer side of the first coil section 4a) and S2a (inner side of the primary coil assembly 2, cf. innermost turn layer 6) corresponds in this case to approximately ⅗ of the sum of the halved thickness $D_{SS}$ of the first coil section 4a of the secondary coil assembly 4 and the halved thickness $D_P$ of the primary coil assembly 2. The interstice ZR is essentially determined by the (total) wall thickness WS of the cryostat 5 and the distances of the first coil section 4a and the primary coil assembly 2 of the cryostat 5a.

The same applies to an interstice between the second coil section 4b (cf. inner side S4b) and the primary coil assembly 2 (cf. outer side S2b) (not depicted in any further detail). Note that in the schematic view, the radial distances between the outer walls of the cryostats 5a, 5b and the primary coil assembly 2 and also the radial distances between the coil sections 4a, 4b of the secondary coil assembly 4 and the inner walls of the cryostats 5a, 5b are shown enlarged.

Due to the inventive radial division of the secondary coil assembly 4 and the positioning of the primary coil assembly 2 radially between the coil sections 4a, 4b of the secondary coil assembly 4, the radial distance between the secondary coil assembly 4 and the most distant turn layer of the primary coil assembly 2 can be clearly reduced as compared with conventional positioning of the secondary coil assembly radially inside or radially outside the primary coil assembly.

Note that an inventive secondary coil assembly divided into two can be relatively simply retrofitted to an existing, conventional inductive fault current limiter, by adding the missing coil section of the secondary coil assembly.

Figure 2A:
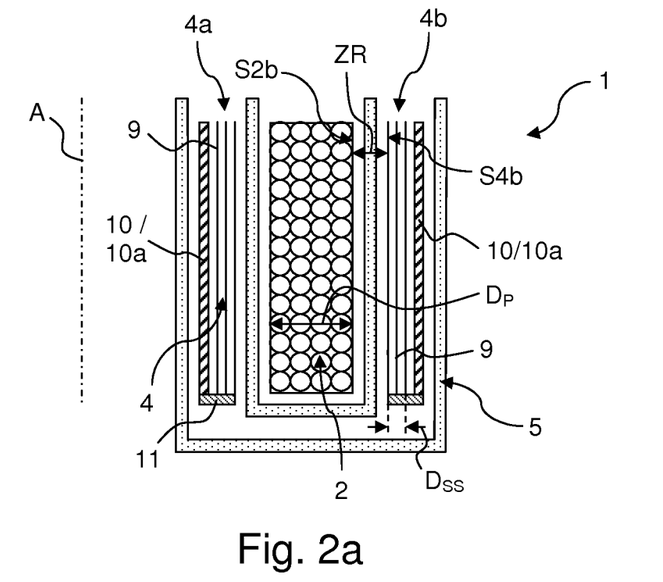
FIG. 2a a schematic sectional view of a second embodiment of an inventive fault current limiter, with shunt configurations for the coil sections of the secondary coil assembly.

FIG. 2a schematically illustrates a second embodiment of an inventive fault current limiter 1. For simplification, only one half of the sectional view is shown. (This also applies to FIGS. 3, 4, and 5). Above all, the differences from the previous embodiment are explained.

In this embodiment, the coil sections 4a, 4b of the secondary coil assembly 4 are disposed in a common cryostat 5. Each coil section 4a, 4b comprises three single-turn coils 9 interleaved in each other. In this case, the total of six turns of the secondary coil assembly 4 are distributed evenly among the two coil sections 4a, 4b accordingly. One normally conducting shunt configuration 10 is located on each side of the coil sections 4a, 4b facing away from the primary coil assembly 2, each of which comprises a single, closed shunt ring 10a. The single-turn coils 9 of the two coil sections 4a, 4b are electrically and thermally connected to each other and to the shunt ring 10a via jumpers 11 distributed in the circumferential direction.

Figure 2B:
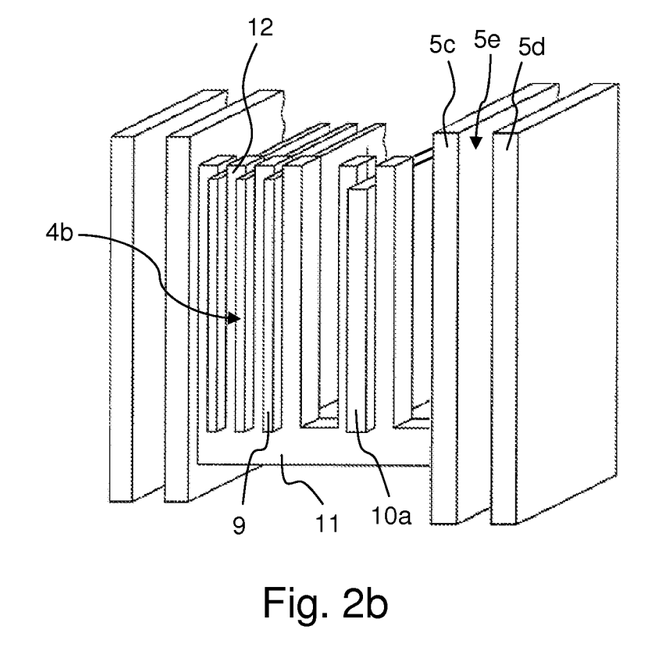
FIG. 2b a cutaway view of an embodiment of FIG. 2a, in a schematic oblique view.

The region of such a jumper 11 at the second coil section 4b is especially clearly shown in the cutaway of FIG. 2b in a schematic oblique view. The jumper 11 forms rake-like clamping holders 12 for the single-turn coils 9 and the shunt ring 10a. The cryostat 5 is constituted here with a double wall 5c, 5d and an evacuated cryo-insulation region 5e inside it. In normal operation, the shunt ring 10a of the second coil section 4b is magnetically shielded radially inward from the primary coil assembly 2 by the superconducting single-turn coils 9 of the secondary coil assembly 4. The same applies to the shunt ring 10a of the coil section 4a (see FIG. 2a), which is shielded radially outward from the primary coil assembly 2 by the single-turn coils 9 of the first coil section 4a.

In the embodiment shown in FIG. 2a, the radial interstice ZR corresponds to approx. 7/10 of the sum of half the thickness $D_{SS}$ of the second coil assembly 4b of the secondary coil assembly 4 and half the thickness $D_P$ of the primary coil assembly 2, relative to their opposite sides S2b, S4b facing each other; note that the thickness $D_{SS}$ of the coil section 4b is only determined by their superconducting turns, that is, the single-turn coils 9, but not by the shunt ring 10a. The same applies here to the interstice between the first coil section 4a of the secondary coil assembly 4 and the primary coil assembly 2 (not depicted in any further detail).

Figure 3:
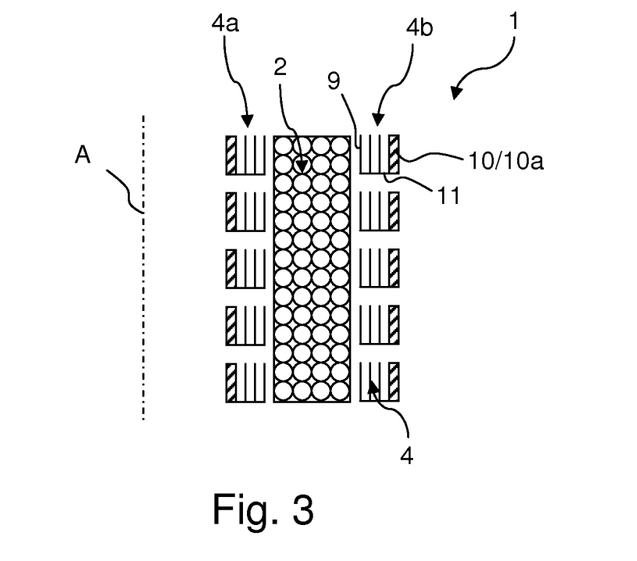
FIG. 3 a schematic sectional view of a third embodiment of an inventive fault current limiter, wherein the coil sections of the secondary coil assembly are divided in the axial direction.

FIG. 3 shows a third embodiment of an inventive fault current limiter 1. For simplification, the cryostat or cryostats for the secondary coil assembly 4 have been omitted in the view (also applies to FIG. 4 and FIG. 5). Only the essential differences from the embodiment in FIG. 2a are explained.

In this embodiment, the coil sections 4a, 4b of the secondary coil assembly 4 and the associated shunt configurations 10 are divided into multiple axial levels (five levels in this case), cf. the vertical axis A. One shunt ring 10a, three single-turn coils 9 and one jumper 11 are provided for each coil section 4a, 4b in each level.

Due to the axial subdivision, even in axially extending fault current limiters (for example, in the axial height range 1 to 2 m or more), strip-shaped superconductors with usual conductor widths (usually 1 cm to 4 cm, in the axial direction) can be used; in practice, usually ten or more, often also forty or more levels are provided.

Figure 4:
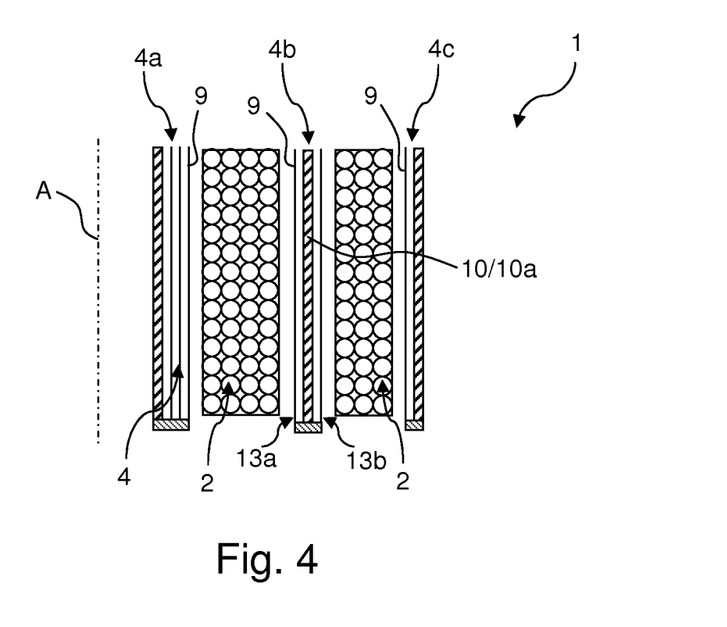
FIG. 4 a schematic sectional view of a fourth embodiment of an inventive fault current limiter, wherein the secondary coil assembly has three radially spaced coil sections, between which two primary coil assemblies are disposed.

FIG. 4 finally shows an embodiment of an inventive fault current limiter 1, in which the secondary coil assembly 4 has three coil sections 4a, 4b, 4c in total. A primary coil section 2 is disposed between the radially innermost coil section 4a and the radially central coil section 4b and also between the radially central coil section 4b and the radially outer coil section 4c.

Here, the radially innermost coil section 4a has three single-turn coils 9 interleaved in each other, the radially central coil section 4b has two single-turn coils 9, and the radially outermost coil section 4c has only one single-turn coil 9. The single-turn coils 9 each provide one superconductively closed current path. A shunt configuration 10 with a shunt ring 10a for the radially central coil section 4b of the secondary coil assembly 4 is, in this case, radially disposed between the two single-turn coils 9 of this coil section 4b so that, in each case, a part 13a, 13b of the coil section 4b (one single-turn coil 9 each in this case) is positioned radially between this shunt ring 10a and the radially inner and outer adjacent primary coil assemblies 2. This achieves two-sided shielding and induction of eddy currents in the shunt ring 10a of the central coil section 4b is minimized. Note that multiple shunt rings interleaved in each other can also be used, for example, to protect the radially inner single-turn coil 9 and the radially outer single-turn coil 9 separately with shunt resistors.

Also note that the primary coil assemblies 2 each have a different number of turn layers (four and three in this case), wherein the number of turn layers per primary coil assembly 2 decreases in the radially outward direction. In practice, according to the invention, thirty or more, often sixty or more turn layers in a primary coil assembly 2 are generally provided, and the primary coil assemblies (or their turn layers) have a considerable radial thickness, usually 6 cm and more, often 15 cm and more. In this case, the primary coil assemblies 2 are connected in series to each other (not shown in any further detail).

Figure 5:
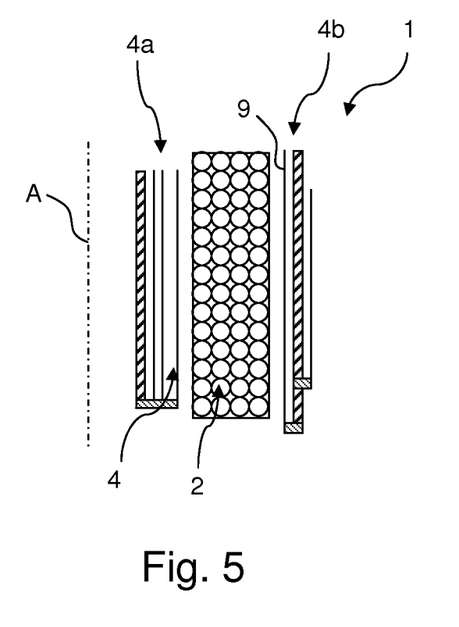
FIG. 5 a schematic sectional view of a fifth embodiment of an inventive fault current limiter, wherein the coil sections of the secondary coil assembly are of different lengths in the axial direction.

FIG. 5 shows an embodiment of an inventive fault current limiter 1, in which the radially inner, first coil section 4a of the secondary coil assembly 4 is shorter than the primary coil assembly 2 and the second, radially outer secondary coil section 4b of the secondary coil assembly 4. This achieves a favorable relative magnetic field direction toward the surface of the single-turn coils 9 of the secondary coil assembly 4. Note that the length of the coil sections 4a, 4b or parts thereof can also be determined with a different number of levels for single-turn coils (cf. FIG. 3).

For magnetic field optimization, the radial distances between the single-turn coils 9 of the first coil section 4a are unequal (the inner distance being smaller than the outer distance); in this case, the turns of the secondary coil assembly 4 are therefore unevenly distributed in the radial direction.

Furthermore, the two single-turn coils 9 of the second coil section 4b are constituted with different lengths in the axial direction; the turns of the secondary coil assembly 4 are therefore unevenly distributed in the axial direction in this case. The single-turn coil 9 located further inside is just as long as the primary coil assembly 2; this single-turn coil 9 that extends the farthest upward and downward determines the total length of the secondary coil assembly 4. The single-turn coil 9 located further out is approx. 30% shorter than the single-turn coil 9 located further inside; in this way, the magnetic field distribution of the fault current limiter 1 can also be optimized.

An inventive inductive fault current limiter can be used to limit or prevent a current rise in a protected alternating current carrying electric conductor during operational faults (for example, short circuits). The electric conductor can, in particular, be part of a public electricity supply network or be located in a transformer substation.

We claim:

1. An inductive fault current limiter, comprising:
 a normally conducting primary coil assembly with a multiplicity of turns; and
 a superconducting, short-circuited secondary coil assembly, wherein said primary coil assembly and said secondary coil assembly are disposed at least substantially coaxially with respect to each other and at least partially interleaved in each other, said secondary coil assembly comprising a first coil section and a second coil section, wherein said first coil section is disposed radially inside said turns of said primary coil assembly and second coil section is disposed radially outside said turns of said primary coil assembly.

2. The fault current limiter of claim 1, wherein said primary coil assembly is disposed substantially centrally between an outer side of said first coil section of said secondary coil assembly and an inner side of said second coil section of said secondary coil assembly.

3. The fault current limiter of claim 1, wherein said first and said second coil sections of said secondary coil assembly each comprise one or more superconducting, ring-shaped closed single-turn coils.

4. The fault current limiter of claim 1, wherein said secondary coil assembly comprises a plurality of turns that are distributed substantially evenly among said first and said second coil sections of said secondary coil assembly.

5. The fault current limiter of claim 1, wherein said secondary coil assembly comprises a plurality of turns that are distributed unevenly among said first and said second coil sections of said secondary coil assembly.

6. The fault current limiter of claim 1, wherein said secondary coil assembly comprises a plurality of turns, which are distributed unevenly in said first and said second coil sections of said secondary coil assembly in a radial direction and/or in an axial direction, and/or said first and said second coil sections of said secondary coil assembly extend different distances in said axial direction.

7. The fault current limiter of claim 1, wherein said first and said second coil sections of said secondary coil assembly are each electrically conductively connected to a normally conducting shunt configuration.

8. The fault current limiter of claim 7, wherein said shunt configuration of said first coil section of said secondary coil assembly is disposed radially inside at least a part of said first coil section of said secondary coil assembly and a shunt configuration of said second coil section of said secondary coil assembly is disposed radially outside at least a part of said second coil section of said secondary coil assembly.

9. The fault current limiter of claim 7, wherein said shunt configuration has one or more closed shunt rings.

10. The fault current limiter of claim 7, wherein said shunt configuration has a multiplicity of metallic jumpers, which electrically conductively connect said shunt configuration to an associated first or second coil section of said secondary coil assembly.

11. The fault current limiter of claim 1, wherein said primary coil assembly and said secondary coil assembly are constructed at least substantially rotationally symmetrically with respect to an axis or with respect to a vertical axis.

12. The fault current limiter of claim 1, further comprising a ferromagnetic core disposed radially inside said first coil section of said secondary coil assembly.

13. The fault current limiter of claim 1, wherein said secondary coil assembly extends a substantially same distance in an axial direction as said primary coil assembly.

14. The fault current limiter of claim 1, wherein said secondary coil assembly is made of a high-temperature superconducting material, of YBCO or of BSCCO.

15. The fault current limiter of claim 1, wherein said first and said second coil section of said secondary coil assembly are disposed in a common cryostat or in different cryostats and said primary coil assembly, said first and second coil sections of said secondary coil assembly and said common cryostat or said different cryostats are positioned and dimensioned such that $ZR < \frac{1}{2}D_P + \frac{1}{2}D_{SS}$ or $ZR < \frac{1}{2}D_{SS}$, wherein ZR: interstices in a radial direction between mutually opposite sides of said primary coil assembly and said first and said second coil sections of said secondary coil assembly, $D_P$: thickness of said primary coil assembly in a radial direction limiting a relevant said interstice ZR and $D_{SS}$: thickness of said first or said second coil section of said secondary coil assembly in said radial direction limiting a relevant said interstice ZR.

16. The fault current limiter of claim 1, wherein said secondary coil assembly has N coil sections, where N ∈IN and N≥3, and the fault current limiter has N−1 primary coil assemblies, wherein each primary coil assembly is disposed radially between two coil sections of said secondary coil assembly or N=3 or N=4.

17. The fault current limiter of claim 16, wherein a first or second coil section of said secondary coil assembly, which is disposed radially between two primary coil assemblies, has a shunt assembly, which is surrounded both radially inside and radially outside by a part of that first or second coil section.

* * * * *